(No Model.)  2 Sheets—Sheet 1.
J. S. ADAMS.
SKELETON TOWER FOR ELECTRIC LIGHTS.
No. 336,371. Patented Feb. 16, 1886.
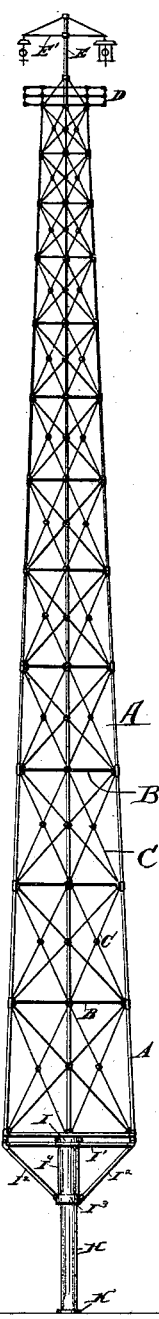
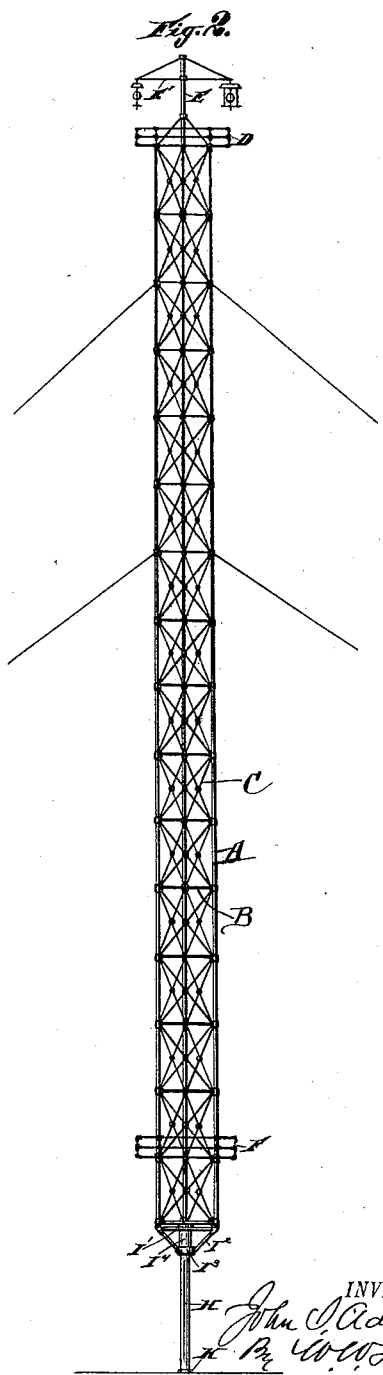
WITNESSES
INVENTOR
Attorney (No Model.) 2 Sheets—Sheet 2.
J. S. ADAMS.
SKELETON TOWER FOR ELECTRIC LIGHTS.
No. 336,371. Patented Feb. 16, 1886.
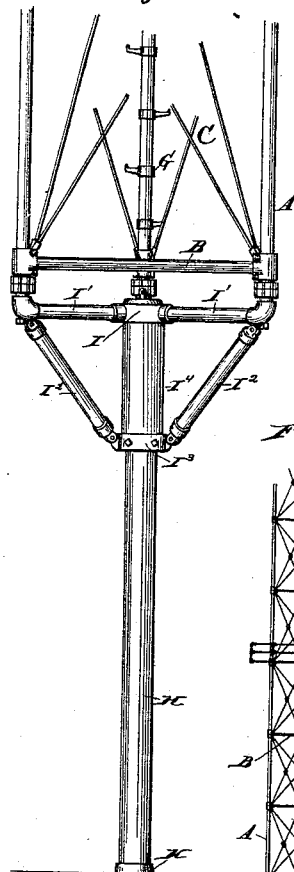
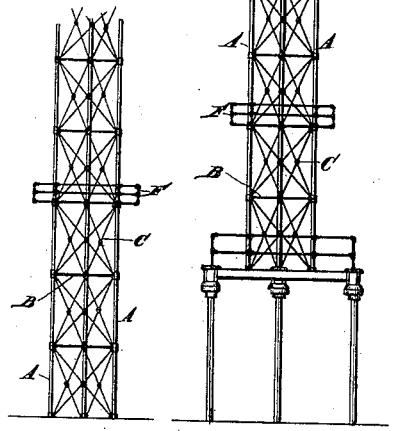
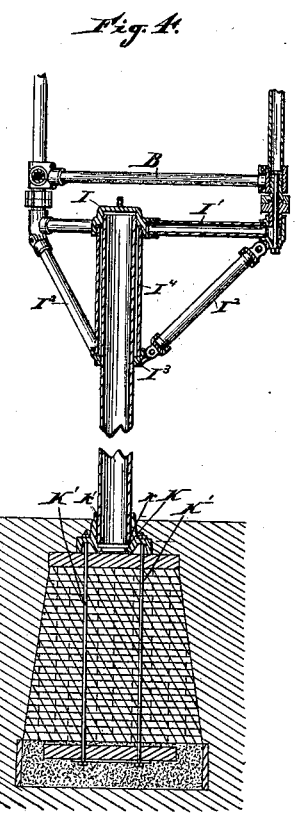
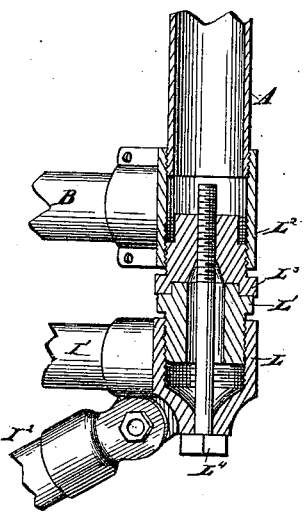
WITNESSES
INVENTOR
Attorney

UNITED STATES PATENT OFFICE.

JOHN S. ADAMS, OF DETROIT, MICHIGAN, ASSIGNOR TO THE DETROIT IRON TOWER COMPANY, OF SAME PLACE.

SKELETON TOWER FOR ELECTRIC LIGHTS.

SPECIFICATION forming part of Letters Patent No. 336,371, dated February 16, 1886.

Application filed October 18, 1884. Serial No. 145,850. (No model.)

*To all whom it may concern:*

Be it known that I, JOHN S. ADAMS, of Detroit, county of Wayne, State of Michigan, have invented a new and useful Improvement in Skeleton Towers for Electric Lights; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

In the drawings, Figure 1 is an elevation of a tower embodying my invention, said tower being of prismatic form and supported upon a single pillar at the base. Fig. 2 is a variation of the same. Fig. 3 is an enlarged view in elevation of the lower section and pillar. Fig. 4 is a sectional view of the same and of the foundation mechanism. Fig. 5 is a variation representing the three corner elements extending to the ground. Fig. 6 is another variation in which the prismatic tower is supported upon an elevated platform. Fig. 7 illustrates in detail the mechanism for anchoring the uprights to the brackets.

In carrying out my invention, A represents the upright corner elements of a skeleton tower; B, its horizontal girts; C, its diagonal braces. The upright corner elements are disposed parallel with each other from the base to the top of the tower.

The tower may be constructed of three or more such corner elements. I prefer to employ three, as shown, so that any section of the tower shall be an equilateral triangle, and the sections shall be the same in size from the base of the tower to the top. At the top is a platform, D, and suitable lamp-supports, the lamp-support shown consisting of a central mast, E, with projecting arms E'.

F is a platform at the base, which may or may not be employed. Steps G are preferably provided at one of the corner elements, as shown in Fig. 3, and an elevator may or may not be employed. (None is shown in the drawings.) These corner elements, A, may extend directly to the ground and be there anchored to suitable foundations, and I have constructed many of them in that form; or a prismatic tower of this form may be supported at its base upon a suitable platform, which will permit a free passage beneath the tower. I have also employed this form of structure, the said structures respectively being represented in Figs. 5 and 6 of the drawings. In order, however, that the base of the tower may occupy only a small space, similar to that occupied by a lamp-post at a street corner, I prefer to provide a pillar or single leg support, H, at the base of the tower. This may be constructed in any suitable manner. I have usually made a bracket construction at the top of the pillar, consisting of a cap, I, from which project horizontal arms I'. Braces $I^2$ connect the extremities of the arms with the pillar a distance down. Where they connect with the pillar is a collar, $I^3$, which engages by a screw-thread with a sleeve, $I^4$, as shown. This pillar is secured at its lower end into a malleable-iron base-plate K, which in turn is firmly anchored to a foundation-pier by anchor-bolts K'. I prefer to screw the pillar to the base-plate by threads at $k$, and to fill up the space between the said threads and the top of the base-plate (shown at $k'$) with lead or other solid filling. This greatly strengthens the pillar at the base and gives to it great stiffness adjacent to the foundation. I prefer generally to support these prismatic forms of towers by guy ropes or rods, which extend out laterally to suitable guy-posts or other fastenings. I do not, however, limit myself to a structure requiring guys, for to avoid the use of guys it is only necessary to make the pillar at the base very strong and stiff, in which case the structure is self-supporting. In this latter case it is not absolutely essential that the shape of the tower should be prismatic, for it may be enlarged at the top of the pillar and tapered slightly from that point to the top of the tower, as shown in Fig. 1.

I will now describe the mechanism I employ for anchoring the shaft of the tower to the brackets at the top of the pillar.

L is a fitting at the end of the horizontal arm of the bracket. It is screw-tapped for the admission of a sleeve, L'.

$L^2$ is the ordinary fitting at the base of the upright A, and $L^3$ is a threaded sleeve engaging therewith. This sleeve is tapped on its interior to receive the bolt $L^4$. The sleeves $L'$ and $L^3$ fit loosely together, as shown. If, now, it becomes necessary to tilt the top of the tower in any direction, it is obvious that this can be accomplished by simply adjusting the sleeve $L'$ up or down in the fitting L, and when once properly adjusted the bolt $L^4$ is tightened up, thus combining the whole firmly together.

This construction of tower is very simple and strong, and especially well adapted for electric-light purposes. Its horizontal elements being of uniform length, as also its diagonal elements and its upright sections, should anyone of said pieces be injured in erection, any other similar element may take its place. Again, the structure occupies but a very limited space at the base, and is therefore well adapted for street corners, where a larger spread of base would be very objectionable and frequently unsurmountable. Again, the tower can be very securely stayed with guy ropes or rods, not only at its top, but at points between the top and base, if desired. In this respect the tower has all the advantages of space that is possessed by a single mast, yet possessing the additional advantage that an elevator may be raised or lowered within it without interfering with the location of guy-rods between its top and base. I prefer, generally, to make it of triangular form, since this form affords abundant strength and all horizontal bracing is dispensed with. The absence of horizontal bracing facilitates the employment of an elevator within the tower. I have erected large numbers of these towers. I have usually preserved uniform measurements—six feet for the horizontal elements and eight feet for the sections of the upright elements—regardless of the height of the tower. I would have it understood, however, that these proportions may be varied to any desirable extent.

I would have it understood that I do not limit myself to the peculiar mechanism shown for straightening the tower by raising or depressing one or more of its upright corner elements, but would have it understood that so far as I am aware this means of straightening a skeleton tower has never been employed, and I therefore claim, broadly, any mechanism which, operating substantially as my mechanism does, serves to elevate or depress any corner elements.

What I claim is—

1. A skeleton iron electric-light tower, consisting of an open frame-work of vertical and horizontal sections provided with diagonal braces, said tower being triangular in cross-section and of similar or substantially similar sectional dimensions from base to top, and provided with a mast having projecting arms for supporting electric lamps, and with or without an interior elevator, substantially as described.

2. As a means for supporting a skeleton iron tower, a pillar provided with bracket-arms for receiving the lower ends of the uprights, said arms provided with braces extending beneath the arms to a point upon the pillar, substantially as described.

3. A skeleton iron tower supported by a single pillar at its base, said tower provided at the base of two or more of its upright elements with adjusting mechanism for slightly elevating or depressing either of said corner elements, substantially as described.

4. The combination, with a skeleton iron tower, of a single supporting-pillar at its base, said pillar resting upon a foundation and anchored down through the same by anchor-bolts, substantially as described.

In testimony whereof I sign this specification in the presence of two witnesses.

JOHN S. ADAMS.

Witnesses:
N. S. WRIGHT,
M. B. O'DOGHERTY.